United States Patent
Matsumoto

(10) Patent No.: US 6,731,595 B2
(45) Date of Patent: May 4, 2004

(54) MULTI-CARRIER MODULATION AND DEMODULATION SYSTEM USING A HALF-SYMBOLIZED SYMBOL

(75) Inventor: Wataru Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/130,997

(22) PCT Filed: Sep. 26, 2001

(86) PCT No.: PCT/JP01/08364

§ 371 (c)(1),
(2), (4) Date: May 24, 2002

(87) PCT Pub. No.: WO02/30023

PCT Pub. Date: Apr. 11, 2002

(65) Prior Publication Data

US 2003/0031272 A1 Feb. 13, 2003

(30) Foreign Application Priority Data

Sep. 28, 2000  (JP) ........................................ 2000-297324

(51) Int. Cl.[7] .............................................. H04L 27/32
(52) U.S. Cl. .................... 370/210; 370/335; 370/342
(58) Field of Search ........................ 372/103; 329/304, 329/301, 302; 375/295, 298, 316, 329; 370/485, 512, 203, 343–349, 210, 335–342

(56) References Cited

U.S. PATENT DOCUMENTS 5,732,068 A * 3/1998 Takahashi et al. .......... 370/206
5,771,224 A * 6/1998 Seki et al. ................... 370/206
5,790,516 A * 8/1998 Gudmundson et al. ..... 370/210
6,304,611 B1 * 10/2001 Miyashita et al. .......... 375/260

FOREIGN PATENT DOCUMENTS

JP     8-97798 A       4/1996
JP     2001-36494 A    2/2001

OTHER PUBLICATIONS

Matsumoto et al., Technical Report of the Institute of Electronics, Information and Communication Engineers, vol. 100, No. 514, pp. 1–6, Dec. 16, 2000.

* cited by examiner

Primary Examiner—Minh Nguyen
(74) Attorney, Agent, or Firm—Birch, Stewart, Kolasch & Birch, LLP

(57) ABSTRACT

The communication apparatus at a transmission side executes an inverse Fourier transform to a signal after a BPSK modulation, thereby to generate a transmission symbol, and transmits the transmission symbol in a half-symbolized status. The communication apparatus at a reception side separates a received signal into even sub-carriers and odd sub-carriers, and first demodulates only the received symbol of the half-symbolized even sub-carriers. The communication apparatus at the reception side removes the symbol component of the even sub-carriers from the received symbol, and demodulates only the received symbol of the odd sub-carriers.

4 Claims, 9 Drawing Sheets

FIG.4
(a)
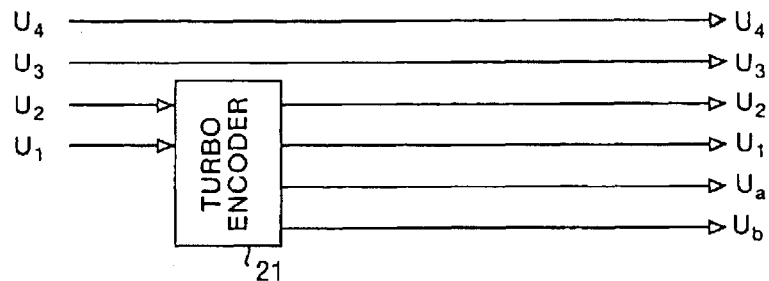
(b)
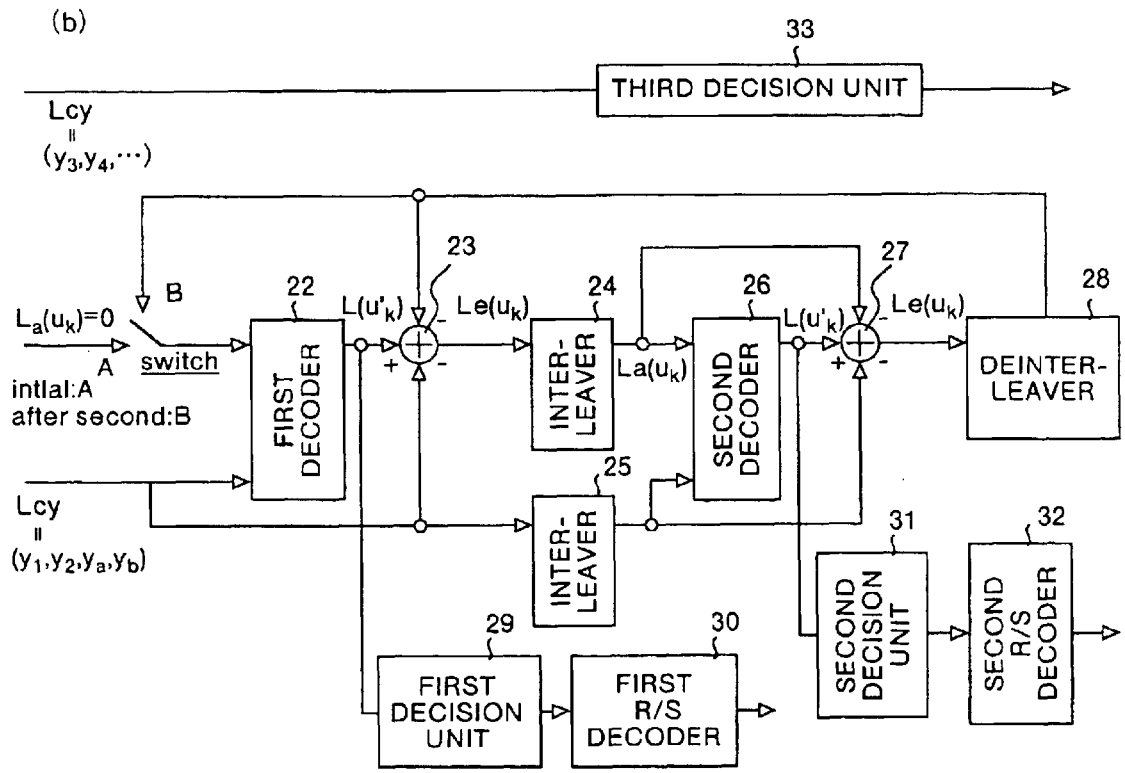

FIG.6
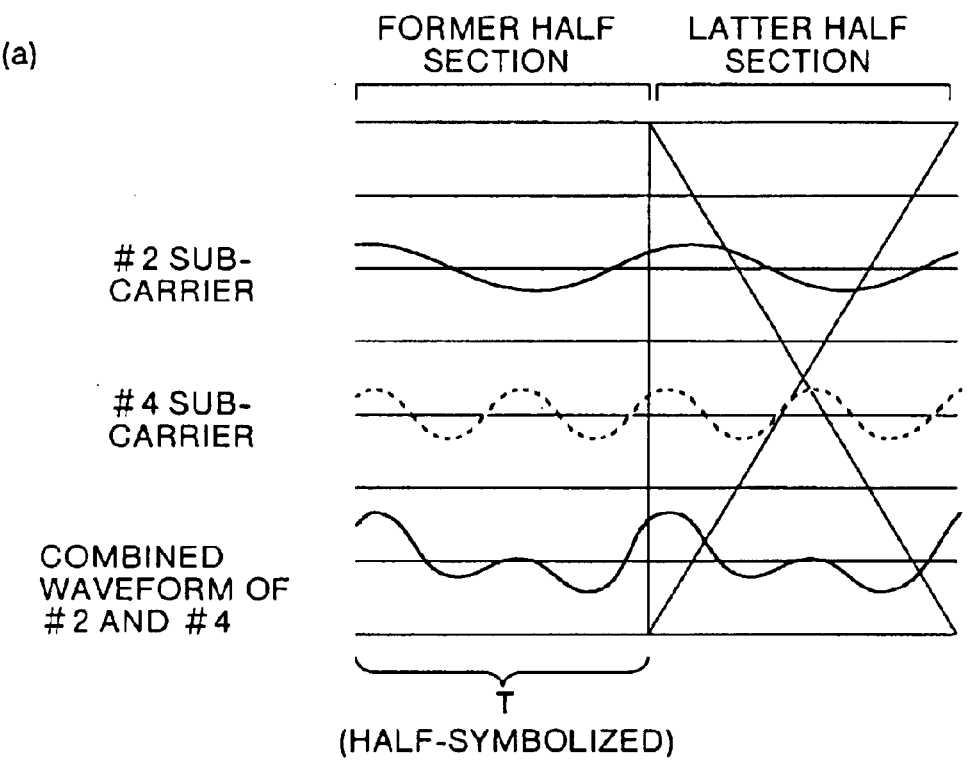
(a)
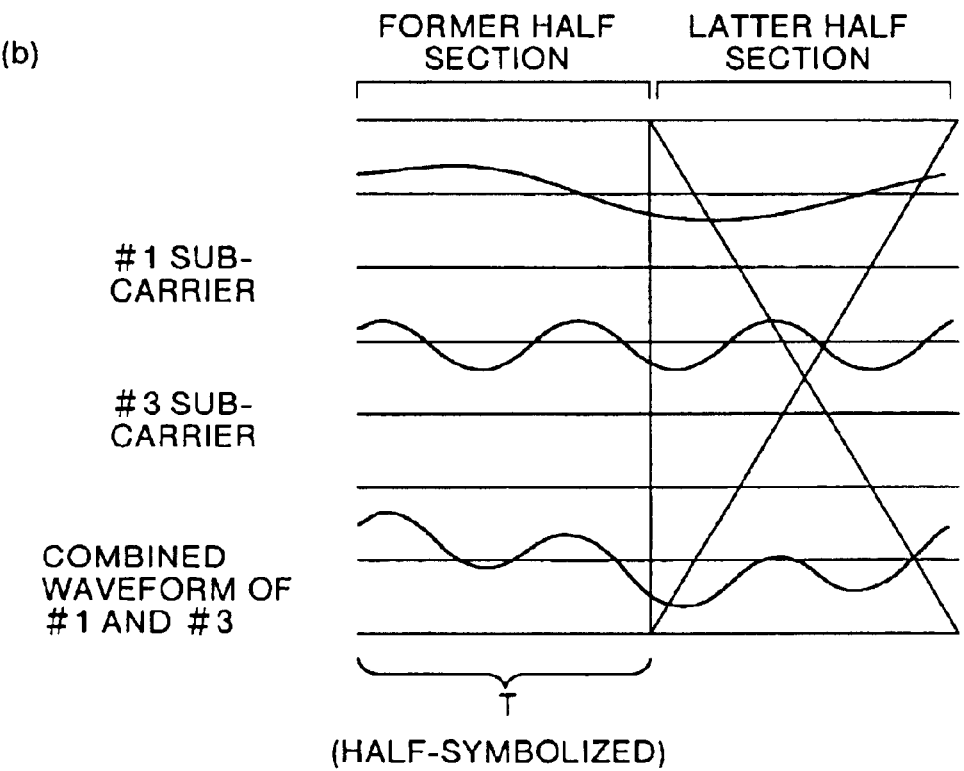
(b)

MULTI-CARRIER MODULATION AND DEMODULATION SYSTEM USING A HALF-SYMBOLIZED SYMBOL

This application is the national phase under 35 U.S.C. §371 of PCT International Application No. PCT/JP01/08364 which has an International filing date of Sep. 26, 2001, which designated the United States of America.

TECHNICAL FIELD

The present invention relates to a communication apparatus that employs a multi-carrier modulation/demodulation system. The invention particularly relates to a communication apparatus and a communication method capable of realizing data communications by using existing communication lines, based on a DMT (Discrete Multi Tone) modulation/demodulation system or an OFDM (Orthogonal Frequency Division Multiplex) modulation/demodulation system. However, the present invention is not limited to a communication apparatus that carries out data communications based on the DMT modulation/demodulation system. It is also possible to apply the present invention to all communication apparatuses that carry out wire communications and radio communications based on a multi-carrier modulation/demodulation system and a single-carrier modulation/demodulation system via normal communication lines.

BACKGROUND ART

The operation of a conventional communication apparatus will be explained below. First, the operation of a transmission system of a conventional communication apparatus that employs the OFDM modulation/demodulation system as a multi-carrier modulation/demodulation system will be briefly explained. When data communications are carried out according to the OFDM modulation/demodulation system, the transmission system carries out a tone ordering processing. In other words, the transmission system allocates transmission data of a transmittable number of bits to a plurality of tones (multi-carriers) of a frequency band that has been set in advance. For example, transmission data of a predetermined number of bits is allocated to tone 0 to tone X (X is an integer that shows a number of tones) of each frequency. The transmission data is multiplexed for each one frame by carrying out the tone ordering processing and an encoding processing.

Further, the transmission system carries out an inverse fast Fourier transform (IFFT) to multiplexed transmission data, and converts a parallel data after the inverse fast Fourier transform into a serial data. Then, the transmission system converts a digital waveform into an analog waveform with a D/A converter. Last, the transmission system applies a low-pass filter, and transmits the transmission data to a transmission route.

Next, the operation of a reception system of the conventional communication apparatus that employs the OFDM modulation/demodulation system as a multi-carrier modulation/demodulation system will be briefly explained. When data communications are carried out according to the OFDM modulation/demodulation system, the reception system applies a low-pass filter to a received data (the above transmission data). Then, the reception system converts an analog waveform into a digital waveform with an A/D converter, and carries out an adaptive equalization of a time domain with a time domain equalizer.

Further, the reception system converts the serial data after the adaptive equalization of the time domain into a parallel data. The reception system carries out a fast Fourier transform to this parallel data, and then carries out an adaptive equalization of a frequency domain with a frequency domain equalizer.

The data after the adaptive equalization of the frequency domain is converted into a serial data according to a composite processing (a maximum likelihood composite method) and a tone ordering processing. Then, a rate converting processing, an FEC (forward error correction), a descramble processing, and a CRC (cyclic redundancy check) are carried out. Last, a transmission data is reproduced.

As explained above, the conventional communication apparatus that employs the OFDM modulation/demodulation system makes it possible to carry out communications at a high transmission rate by utilizing good transmission efficiency and flexibility of functions that cannot be obtained according to the CDMA and the single-carrier modulation/demodulation system.

However, the conventional communication apparatus that employs the OFDM modulation/demodulation system has had room for improvement in the transmission system and the reception system from the viewpoint of "further improvement in the transmission rate". There has been a problem that the conventional communication apparatus has not realized an optimum transmission rate by making a maximum utilization of the "good transmission efficiency" and the "flexibility of functions" that are the characteristics of the OFDM modulation/demodulation system.

Therefore, it is an object of the present invention to provide a communication apparatus and a communication method capable of realizing further improvement in the transmission rate, by realizing half symbolization in the multi-carrier modulation/demodulation system.

DISCLOSURE OF THE INVENTION

The communication apparatus according to the present invention is a structure that employs the multi-carrier modulation/demodulation system, further comprises a transmission unit which generates a transmission symbol by carrying out an inverse Fourier transform to a signal after a BPSK modulation and transmits the transmission symbol in a half-symbolized status, and a reception unit which carries out a predetermined Fourier transform to the half-symbolized received symbol in order to extract even sub-carriers to demodulate data allocated to the sub-carriers, carries out an inverse Fourier transform to the data allocated to the even sub-carriers to generate a first symbol that is structured with a time waveform of even sub-carriers, removes the first symbol component from the received symbol to generate a second symbol that is structured with a time waveform of odd sub-carriers, adds a symbol obtained by copying and inverting the symbol to the back of the second symbol to generate a third symbol, and carries out a predetermined Fourier transform to the third symbol in order to extract odd sub-carriers to demodulate data allocated to the sub-carriers.

In a communication apparatus according to the next invention, the reception unit further carries out an inverse Fourier transform to the data allocated to the odd sub-carriers to generate a fourth symbol that is structured with a time waveform of odd sub-carriers, thereafter, removes the fourth symbol component from the received symbol, and then carries out demodulation processing by using a received symbol after the removal of the fourth symbol component.

A communication apparatus according to the next invention is a structure that employs a multi-carrier modulation/demodulation system, further comprises a transmission unit which generates a transmission symbol by carrying out an inverse Fourier transform to a signal after a BPSK modulation and transmits the transmission symbol in a half-symbolized status, and a reception unit which generates a first symbol that is structured with time axis data of even sub-carriers and odd sub-carriers by generating all data combinations that could occur and by sequentially carrying out an inverse Fourier transform to the data combinations, generates a second symbol that is half-symbolized by deleting a latter half section of the first symbol and subtracts an occasionally-generated second symbol from the received symbol, calculates a squared average (a dispersion value) of amplitude by using a received subtraction result and detects a minimum value from the squared average, and determines a data combination corresponding to the minimum value as most likely from among all the data combinations that could occur and decides this data combination as a final decision value.

A communication apparatus according to the next invention is a structure that employs a multi-carrier modulation/demodulation system, further comprises a transmission unit which generates a transmission symbol by carrying out an inverse Fourier transform to a signal after a BPSK modulation and transmits the transmission symbol in a half-symbolized status, and a reception unit which generates a first symbol that has the same length as that of the symbol before the half-symbolization by adding a symbol of all 0 to the back of a half-symbolized received symbol, extracts even sub-carriers and odd sub-carriers by carrying out a Fourier transform to the first symbol, and judges individually data that is allocated to the even sub-carriers and data that is allocated to the odd sub-carriers.

A communication apparatus according to the next invention is a structure that employs a multi-carrier modulation/demodulation system, and further comprises a reception unit which generates a transmission symbol by carrying out an inverse Fourier transform to a signal after a QPSK modulation and transmits the transmission symbol in a half-symbolized status, and a transmission unit which generates a first symbol that has the same length as that of the symbol before the half-symbolization by adding a symbol of all 0 to the back of a half-symbolized received symbol, extracts even sub-carriers and odd sub-carriers by carrying out a Fourier transform to the first symbol, makes a hard decision on data of the even sub-carriers, calculates a component that becomes an interference to the odd sub-carriers from the decision result, removes the interference component from the odd sub-carriers after the extraction, makes a hard decision on data of odd sub-carriers after the removal of the interference component, calculates a component that becomes an interference to the even sub-carriers from the decision result, and removes the interference component from the even sub-carriers after the extraction, thereafter, repeatedly executes the interference component removal processing by a predetermined number of times, and outputs decision results of both sub-carriers as final decision values.

A communication method according to the next invention comprises a transmission step of generating a transmission symbol by carrying out an inverse Fourier transform to a signal after a BPSK modulation and transmitting the transmission symbol in a half-symbolized status, an even sub-carrier demodulating step of carrying out a predetermined Fourier transform to the half-symbolized received symbol in order to extract even sub-carriers and demodulating data allocated to the sub-carriers, a first-symbol generating step of generating a first symbol that is structured with a time waveform of even sub-carriers by carrying out an inverse Fourier transform to the data allocated to the even sub-carriers, a second-symbol generating step of generating a second symbol that is structured with a time waveform of odd sub-carriers by removing the first symbol component from the received symbol, a third-symbol generating step of generating a third symbol by adding a symbol obtained by copying and inverting the symbol to the back of the second symbol, and an odd sub-carrier demodulating step of carrying out a predetermined Fourier transform to the third symbol in order to extract odd sub-carriers and demodulating data allocated to the sub-carriers.

A communication method according to the next invention further comprises a fourth-symbol generating step of generating a fourth symbol that is structured with a time waveform of odd sub-carriers by carrying out an inverse Fourier transform to the data allocated to the odd sub-carriers, and a removing step of removing the fourth symbol component from the received symbol, and the communication method thereafter carries out a demodulation processing by using a received symbol after the removal of the fourth symbol component.

A communication method according to the next invention comprises a transmission step of generating a transmission symbol by carrying out an inverse Fourier transform to a signal after a BPSK modulation and transmitting the transmission symbol in a half-symbolized status, a first-symbol generating step of generating a first symbol that is structured with time axis data of even sub-carriers and odd sub-carriers by generating all data combinations that could occur and by sequentially carrying out an inverse Fourier transform to the data combinations, a second-symbol generating step of generating a second symbol that is half-symbolized by deleting a latter half section of the first symbol, a subtracting step of subtracting an occasionally-generated second symbol from the received symbol, a squared-average calculating step of calculating a squared average (a dispersion value) of amplitude by using a received subtraction result, a minimum-value detecting step of detecting a minimum value from the squared average, and a decision step of judging a data combination corresponding to the minimum value as most likely from among all the data combinations that could occur and deciding this data combination as a final decision value.

A communication method according to the next invention comprises a transmission step of generating a transmission symbol by carrying out an inverse Fourier transform to a signal after a BPSK modulation and transmitting the transmission symbol in a half-symbolized status, a first-symbol generating step of generating a first symbol that has the same length as that of the symbol before the half-symbolization by adding a symbol of all 0 to the back of a half-symbolized received symbol, a sub-carrier extracting step of extracting even sub-carriers and odd sub-carriers by carrying out a Fourier transform to the first symbol, and a decision step of judging individually data that is allocated to the even sub-carriers and data that is allocated to the odd sub-carriers.

A communication method according to the next invention comprises a transmission step of generating a transmission symbol by carrying out an inverse Fourier transform to a signal after a QPSK modulation and transmitting the transmission symbol in a half-symbolized status, a first-symbol generating step of generating a first symbol that has the same length as that of the symbol before the half-symbolization by adding a symbol of all 0 to the back of a half-symbolized received symbol, a sub-carrier extracting step of extracting even sub-carriers and odd sub-carriers by carrying out a Fourier transform to the first symbol, a first interference component calculating step of making a hard decision on data of the even sub-carriers and calculating a component that becomes an interference to the odd sub-carriers from the decision result, a first removing step of removing the interference component from the odd sub-carriers after the extraction, a second interference component calculating step of making a hard decision on data of odd sub-carriers after the removal of the interference component and calculating a component that becomes an interference to the even sub-carriers from the decision result, and a second removing step of removing the interference component from the even sub-carriers after the extraction, thereafter, the communication method executes the interference component removal processing by a predetermined number of times, and outputs decision results of both sub-carriers as final decision values.

BRIEF DESCRIPTION OF THE DRAWINGS

FIG. 4 shows diagrams that are structures of an encoder and a decoder that are used in the communication apparatus according to the present invention;

FIG. 6 shows diagrams that are waveforms of sub-carriers and combined waveforms respectively;

BEST MODE FOR CARRYING OUT THE INVENTION

Figure 1:
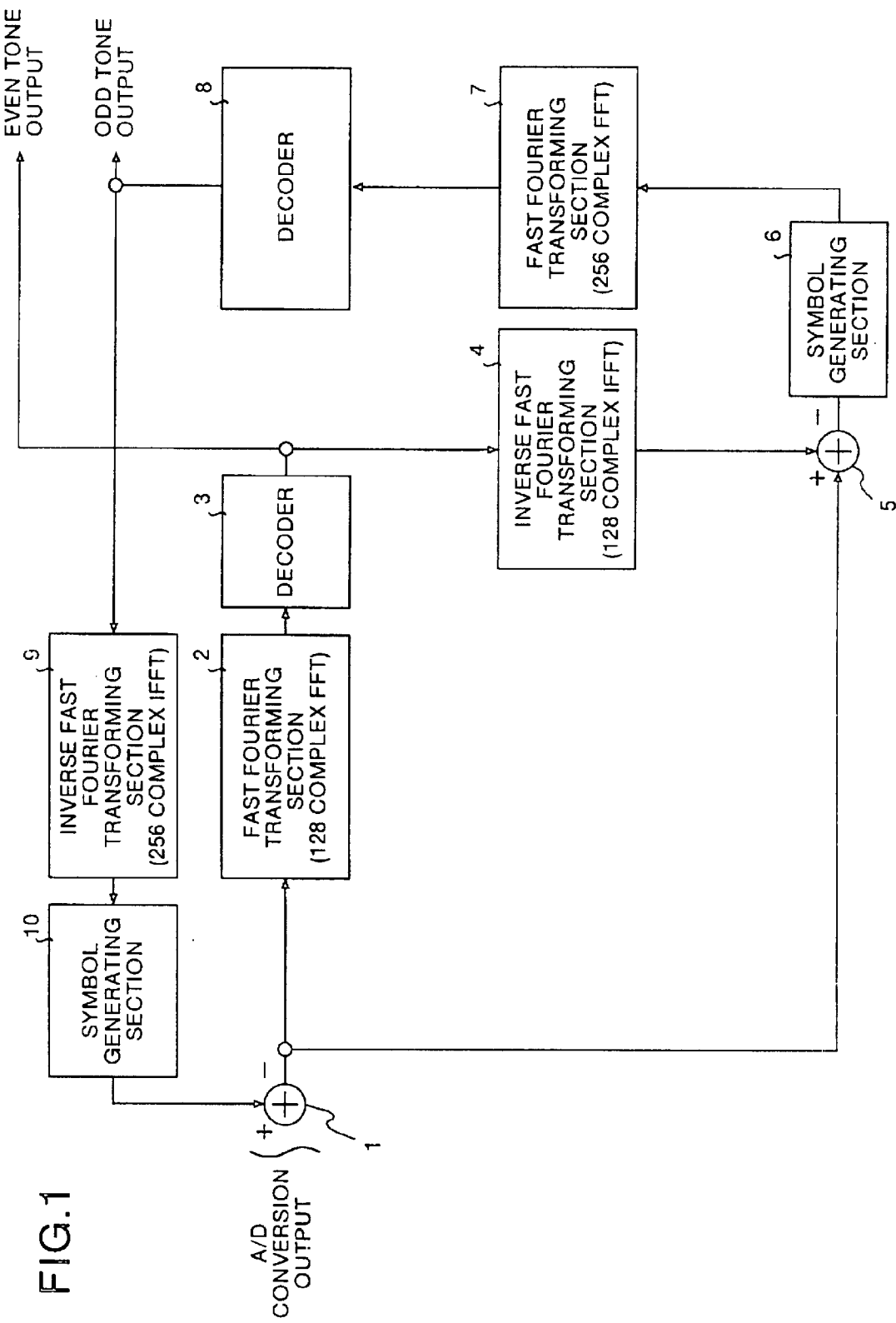
FIG. 1 is a diagram that shows a structure of a first embodiment of the communication apparatus according to the present invention.

Embodiments of the communication apparatus and the communication method according to the present invention will be explained in detail below with reference to the drawings. It should be noted that the present invention is not limited by these embodiments.
First Embodiment FIG. 1 is a diagram that shows a structure of a first embodiment of the communication apparatus according to the present invention. Specifically, FIG. 1 is a diagram that shows a structure of a reception side that is a characteristic of the present embodiment.

The communication apparatus of the present embodiment has both structures of the transmission side and the reception side. Further, the communication apparatus has a high-precision data correction capacity according to a turbo encoder and a turbo decoder, thereby to obtain excellent transmission characteristics in data communications and sound communications. The present embodiment has both of the above structures for the sake of convenience of explanation. It is also possible to assume a transmitter that has only a structure of a transmission side, or a receiver that has only a structure of a reception side.

For example, in the structure of the reception side in FIG. 1, a reference numeral 1 denotes a subtractor, and 2 denotes a fast Fourier transforming section (128 complex FFT) that extracts only 64 even sub-carriers from among 128 sub-carriers. A reference numeral 3 denotes a decoder that decodes even sub-carriers, and 4 denotes an inverse fast Fourier transforming section (128 complex IFFT) that inversely performs fast Fourier transform on only 64 even sub-carriers. A reference numeral 5 denotes a subtractor, 6 denotes a symbol generating section, and 7 denotes a fast Fourier transforming section (256complexFFT) that extracts only 64 odd sub-carriers, for example. A reference numeral 8 denotes a decoder, 9 denotes an inverse fast Fourier transforming section (256 complex IFFT) that inversely performs fast Fourier transform on only 64 odd sub-carriers, and 10 denotes a symbol generating section.

Before explaining the operation of the transmission side and the operation of the reception side that become the characteristics of the present invention, the basic operation of the communication apparatus according to the present invention will be briefly explained with reference to the drawings. As radio digital communication systems that employ a DMT (Discrete Multi Tone) modulation/demodulation system for a multi-carrier modulation/demodulation system, there are xDSL communication systems like an ADSL (Asymmetric Digital Subscriber Line) communication system and an HDSL (high-bit-rate Digital Subscriber Line) communication system that carry out high-speed digital communications of a few mega bits/second by using existing telephone lines. The XDSL systems have been standardized in the T1.413 of ANSI.

Figure 2:
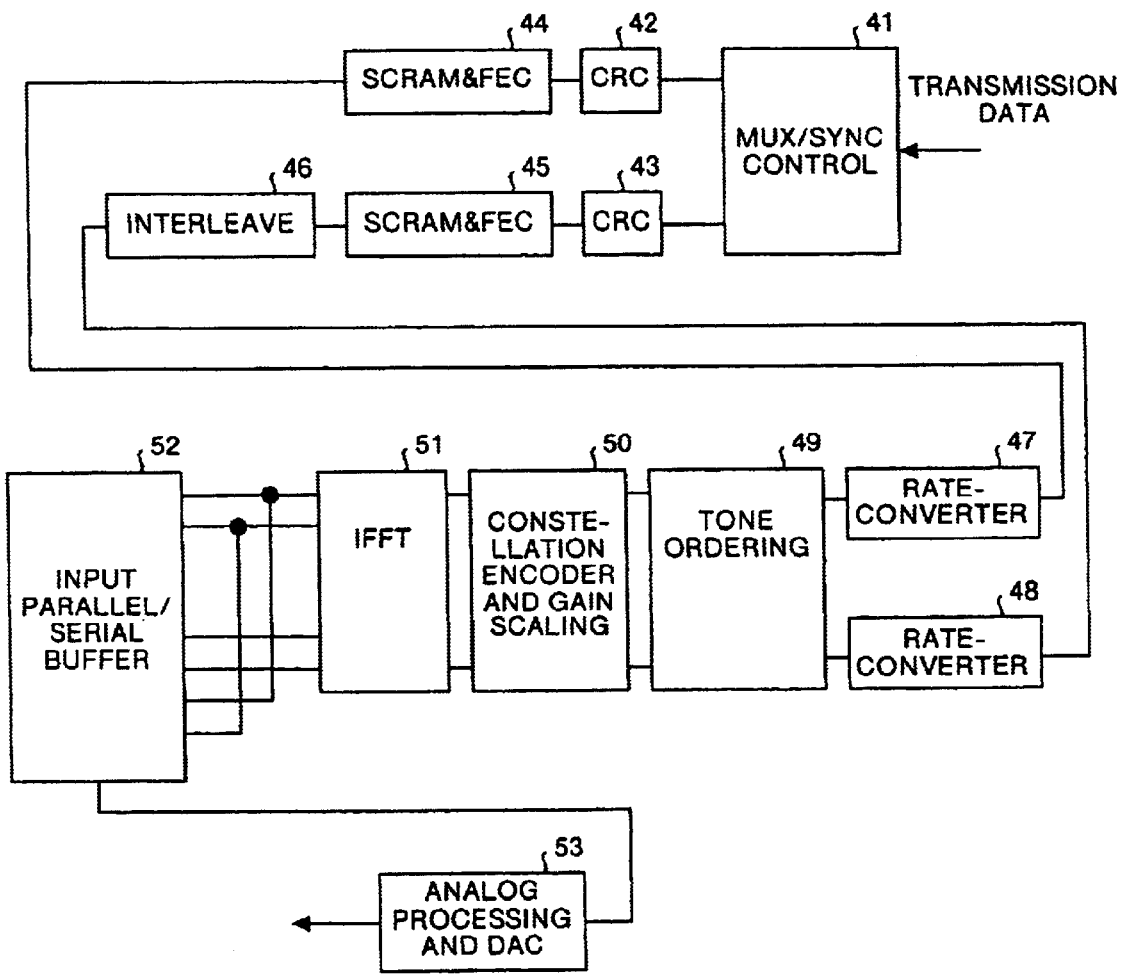
FIG. 2 is a diagram that shows an example of a total structure of a transmission system of a communication apparatus that employs a DMT modulation/demodulation system.

FIG. 2 is a diagram that shows an example of a total structure of the transmission system of the communication apparatus that employs the DMT modulation/demodulation system. Referring to FIG. 2, in the transmission system, a multiplex/synch control (corresponding to MUX/SYNC CONTROL) 41 multiplexes a transmission data. Cyclic redundancy checks (corresponding to CRC) 42 and 43 add error detection codes to multiplexed transmission data. Then, forward error correction (corresponding to SCRAM&FEC) 44 and 45 carry out addition of FEC codes and a scramble processing.

There are two routes from the multiplex/synch control 41 to a tone ordering 49. One is an interleaved data buffer route that includes an interleave (INTERLEAVE) 46, and the other is a fast data buffer route that does not include the interleave. The interleaved data buffer route that carries out an interleave processing has a larger delay.

Then, rate converters (corresponding to RATE-CONVERTOR) 47 and 48 carry out a rate conversion processing to the transmission data, and the tone ordering (corresponding to TONE ORDERING) 49 carries out a tone ordering processing to the transmission data. A constellation encoder/gain scaling (corresponding to CONSTELLATION AND GAINS CALLING) 50 prepares a constellation data (including a turbo decoding), based on the transmission data after the tone ordering processing. An inverse fast Fourier transforming section (corresponding to IFFT) 51 carries out an inverse fast Fourier transform.

Last, an input parallel/serial buffer (corresponding to INPUT PARALLEL/SERIAL BUFFER) 52 converts a parallel data after the Fourier transform into a serial data. An analog processing/digital-to-analog converter (corresponding to ANALOG PROCESSING AND DAC) 53 converts a digital waveform into an analog waveform, executes a filtering processing, and transmits the transmission data to a telephone line.

Figure 3:
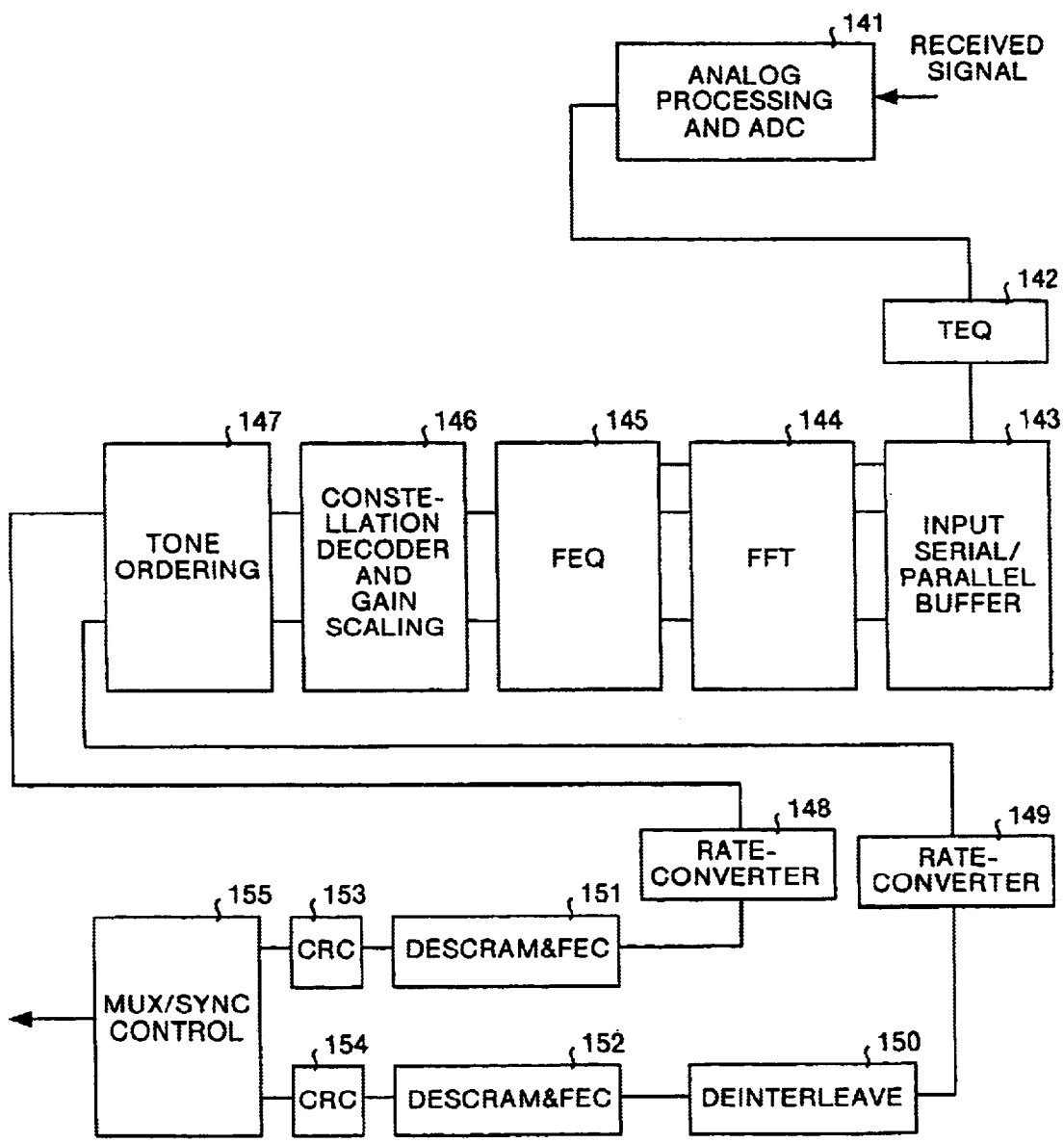
FIG. 3 is a diagram that shows an example of a total structure of a reception system of the communication apparatus that employs a DMT modulation/demodulation system.

FIG. 3 is a diagram that shows an example of a total structure of the reception system of the communication apparatus that employs the DMT modulation/demodulation system. Referring to FIG. 3, in the reception system, an analog processing/analog-to-digital converter (corresponding to ANALOG PROCESSING AND ADC in the drawing) 141 executes a filtering processing to a received data (the above transmission data), and converts an analog waveform into a digital waveform. A time domain equalizer (corresponding to TEQ) 142 carries out an adaptive equalization processing of a time domain.

An input serial/parallel buffer (corresponding to INPUT SERIAL/PARALLEL BUFFER) 143 converts the serial data after the adaptive equalization of the time domain into a parallel data. A fast Fourier transforming section (corresponding to FFT) 144 carries out a fast Fourier transform to the parallel data. Then, a frequency domain equalizer (corresponding to FEQ) 145 carries out an adaptive equalization of a frequency domain.

A constellation decoder/gain scaling (corresponding to CONSTELLATION DECODER AND GAIN SCALLNG) 146 and a tone ordering (corresponding to TONE ORDERING) 147 carry out a decoding (turbo decoding) and a tone ordering processing to the data after the execution of the adaptive equalization of the frequency domain, thereby to convert the data into a serial data. Then, rate converters (corresponding to RATE-CONVERTOR) 148 and 149 carry out a rate conversion. A deinterleaver (corresponding to DEINTERLEAVE) 150 carries out a deinterleave processing. Forward error correction (corresponding to DESCRAM&FEC) 151 and 152 carry out an FEC processing and a descramble processing. Cyclic redundancy check (corresponding to CRC) 153 and 154 carry out a cyclic redundancy check. Last, a multiplex/sync control (corresponding to MUX/SYNC CONTROL) 155 reproduces the received data.

The above communication apparatus has two routes in the reception system and the transmission system respectively. It is possible to realize data communications with small transmission delay and at a high transmission rate by differentially using the two routes or by simultaneously operating the two routes.

The operation of the wire digital communication system that employs the DMT modulation/demodulation system for a multi-carrier modulation/demodulation system has been explained, for the sake of convenience of explanation. However, the present invention is not limited to the above. It is also possible to apply the structure to all communication apparatuses that carry out wire communications and radio communications based on a multi-carrier modulation/demodulation system (for example, the OFDM modulation/demodulation system). The communication apparatus that employs a turbo code has been explained as an encoding processing. However, the code is not limited to the above, and it is also possible to employ a known convolution code, for example. In the present embodiment, the time domain equalizer 142 corresponds to TEQ2 in FIG. 1, the input serial/parallel buffer 143 and the fast Fourier transforming section 144 correspond to a 128 complex FFT 3 in FIG. 1, the frequency domain equalizer 145 corresponds to FEQ4 in FIG. 1, and the subsequent circuits correspond to a decoder 5.

The operation of the encoder (the transmission system) and the decoder (the reception system) in the above communication apparatus that employs the multi-carrier modulation/demodulation system will be explained below with reference to the drawings. FIGS. 4(a) and 4(b) are diagrams that show structures of an encoder (a turbo encoder) and a decoder (a combination of a turbo decoder, a hard decision unit, and an R/S (Reed-Solomon code) decoder that are used in the communication apparatus according to the present invention. Specifically, FIG. 4(a) is a diagram that shows a structure of the encoder in the present embodiment, and FIG. 4(b) is a diagram that shows a structure of the decoder in the present embodiment.

For example, in the encoder shown in FIG. 4(a), a reference numeral 21 denotes a turbo encoder that can obtain performance close to a Shannon limit by employing a turbo code as an error correction code. For an input of two information bits, the turbo encoder 21 outputs two information bits and two redundant bits. Further, each redundant bit is generated such that the correction capacity of each information bit becomes uniform at the reception side.

On the other hand, in the decoder shown in FIG. 4(b) a reference numeral 22 denotes a first decoder that calculates a logarithmic likelihood ratio from a received signal Lcy (corresponding to received signals $y_2$, $y_1$, and $y_a$ to be described later), 23 and 27 denote adders, and 24 and 25 denote interleavers. A reference numeral 26 denotes a second decoder that calculates a logarithmic likelihood ratio from a received signal Lcy (corresponding to received signals $y_2$, $y_1$, and $y_b$ to be described later), and 28 denotes a deinterleaver. A reference numeral 29 denotes a first decision unit which decides an output of the first decoder 22, and outputs an estimated value of an original information bit string. A reference numeral 30 denotes a first R/S decoder that decodes Reed-Solomon code, and outputs a higher-precision information bit string. A reference numeral 31 denotes a second decision unit which decides an output of the second decoder 26, and outputs an estimated value of an original information bit string. A reference numeral 32 denotes a second R/S decoder that decodes Reed-Solomon code, and outputs a higher-precision information bit string. A reference numeral 33 denotes a third decision unit which makes a hard decision on Lcy (corresponding to received signals $y_3$, $y_4$, . . . to be described later), and outputs an estimated value of an original information bit string.

First the operation of the encoder shown in FIG. 4(a) will be explained. In the present embodiment, a 16 QAM will be employed for a quadrature amplitude modulation (QAM). Further, in the present embodiment, the encoder executes a turbo encoding to only the lower two bits of the input data, and outputs other higher bits in the status of the input data. In other words, in the present embodiment, a turbo encoding of excellent error correction capacity is executed to the lower two bits of four signal points (that is, four points of shortest distance between signal points) that have a possibility of degradation in characteristics. A soft decision is made at the reception side. On the other hand, other higher bits that have a lower possibility of degradation in characteristics are output as they are, and a hard decision is made at the reception side.

Figure 5:
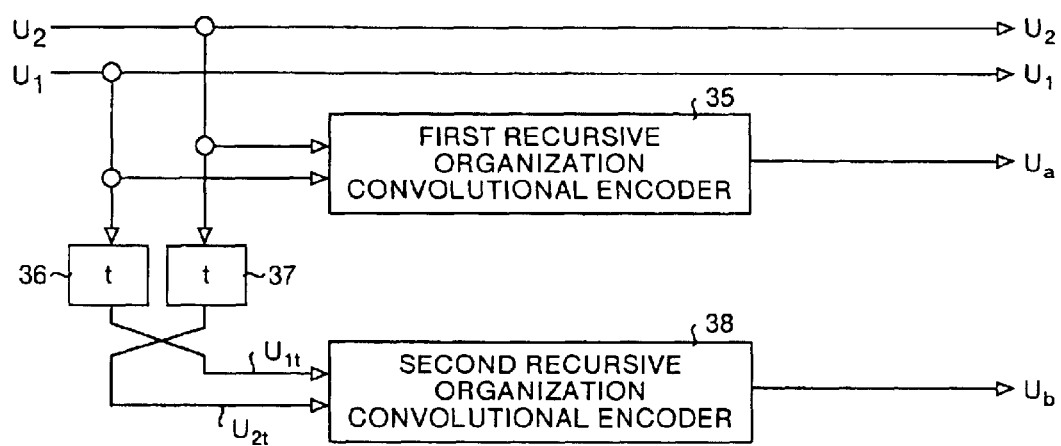
FIG. 5 is a diagram that shows an example of a structure of a turbo encoder.

Next, one example of the operation of the turbo encoder 21 shown in FIG. 4(a) that executes a turbo encoding to the lower two bits $u_1$ and $u_2$ of the input transmission data will be explained. FIG. 5 is a diagram that shows an example of a structure of the turbo encoder 21. It is noted that a known recursive organization convolutional encoder will be used as a structure of a recursive organization convolutional encoder.

In FIG. 5, a reference numeral 35 denotes a first recursive organization convolutional encoder that convolutionally encodes the transmission data $u_1$ and $u_2$ corresponding to the information bit string, and outputs a redundant data $u_a$. Reference numerals 36 and 37 denote interleavers, and 38 denotes a second recursive organization convolutional encoder that convolutionally encodes interleaved data $u_{1t}$ and $u_{2t}$, and outputs a redundant data $u_b$. The turbo encoder 21 outputs simultaneously the transmission data $u_1$ and $u_2$, the redundant data $u_a$ that has been obtained by encoding the transmission data $u_1$ and $u_2$ based on the processing of the first recursive organization convolutional encoder 35, and the redundant data $u_b$ that has been obtained by encoding (at a different time from that for the other data) the interleaved data $u_{1t}$ and $u_{2t}$ based on the processing of the second recursive organization convolutional encoder 38.

The turbo encoder 21 avoids the occurrence of a deviation in the weight of each redundant bit so that the estimate precision of the transmission data $u_1$ and $u_2$ at the reception side that uses the redundant data $u_a$ and $u_b$ becomes uniform.

As explained above, when the encoder shown in FIG. 4(a) is used, it becomes possible to improve the error correction capacity which corrects a burst error of data, as an effect of the interleaving. Further, it becomes possible to make uniform the estimate precision of the transmission data $u_1$ and $u_2$ at the reception side by changing over the input of the transmission data $u_1$ series and the transmission data $u_2$ series between the first recursive organization convolutional encoder 35 and the second recursive organization convolutional encoder 38.

The operation of the decoder shown in FIG. 4(b) will be explained next. This will be explained based on the employment of the 16 QAM method for the quadrature amplitude modulation (QAM) in the present embodiment. Further, in the present embodiment, the decoder executes a turbo decoding to the lower two bits of the received data, and estimates the original transmission data based on a soft decision. The third decision unit 33 makes a hard decision on other higher bits of the received data, and estimates the original transmission data based on the hard decision. Received signals Lcy: $y_4$, $y_3$, $y_2$, $y_1$, $y_a$, and $y_b$ denote signals that have given influence of noise and fading in the transmission route to outputs $u_4$, $u_3$, $u_2$, $u_1$, $u_a$, and $u_b$ at the transmission side respectively.

When the turbo decoder has received the signals Lcy: $y_2$, $y_1$, $y_a$, and $y_b$, the first decoder 22 extracts the received signals Lcy: $y_2$, $y_1$, and $y_a$, and calculates logarithmic likelihood ratios $L(u_{1k}')$ and $L(u_{2k}')$ of information bits (corresponding to the original transmission data $u_{1k}$ and $u_{2k}$) $u_{1k}$, and $u_{2k}$, that are estimated from these received signals (k represents a time). In other words, a probability that $u_{2k}$ is 1 to a probability that $u_{2k}$ is 0, and a probability that $u_{1k}$ is 1 to a probability that $u_{1k}$ is 0, are obtained. In the following explanation, $u_{1k}$ and $u_{2k}$ will be simply called $u_k$, and $u_{1k}'$ and $u_{2k}'$ will be simply called $u_{k'}$.

Where, in FIG. 4(b), Le $(u_k)$ denotes external information, and La $(u_k)$ denote a priori information that is external information of one before. As a decoder that calculates a logarithmic likelihood ratio, a known maximum posteriori probability decoder (MAP algorithm: maximum A-posteriori) is used in many cases. Instead, a known Viterbi decoder may be used.

Next, the adder 23 calculates external information Le $(u_k)$ to the second decoder 26, from the logarithmic likelihood ratio as a result of the calculation. La (uk)=0, as a priori information has not been obtained in the first decoding.

Next, the interleavers 24 and 25 rearrange the received signal Lcy and the external information Le $(u_k)$. The second decoder 26 calculates a logarithmic likelihood ratio L $(u_k')$ based on the received signal Lcy and the a priori information La $(u_k)$ that has been calculated in advance, in a similar manner to that of the first decoder 22.

The adder 27 then calculates the external information Le $(u_k)$, in a similar manner to that of the adder 23. At this time, the external information that has been rearranged by the deinterleaver 28 is fed back to the first decoder 22 as the priori information La $(u_k)$.

The turbo decoder executes the above processing repeatedly by a predetermined number (iteration time), thereby to calculate a higher-precision logarithmic likelihood ratio. The first decision unit 29 and the second decision unit 31 decides on the signal based on this logarithmic likelihood ratio, thereby to estimate the original transmission data. Specifically, when the logarithmic likelihood ratio is "L $(u_k')>0$", for example, the estimate information bit $u_k'$ is judged as 1, and when "L $(u_k')\leq 0$", the estimate information bit $u_k'$ is judged as 0. The third decision unit 33 makes a hard decision on the received signals Lcy: $y_3$, $y_4$, . . . that are received simultaneously.

Last, the first R/S decoder 30 and the second R/S decoder 32 check errors by using a Reed-Solomon code according to a predetermined method. The above repeated processing is finished when a decision has been made that a specific reference has been exceeded. The first R/S decoder 30 and the second R/S decoder 32 correct errors in the original transmission data that have been estimated by the decision units, by using the Reed-Solomon code, and output higher-precision transmission data.

Methods of estimating the original transmission data by the first R/S decoder 30 and the second R/S decoder 32 will be explained according to examples. There are three method examples. A first method is as follows. Each time when the first decision unit 29 or the second decision unit 31 estimates the original transmission data, the corresponding first R/S decoder 30 or the second R/S decoder 32 alternately checks errors. When any one of these R/S decoders has decided that "there is no error", the repetitive processing by the turbo encoder is finished. Then, the error correction is carried out for the estimated original transmission data by using the Reed-Solomon code, and the transmission data of higher estimate precision is output.

A second method is as follows. Each time when the first decision unit 29 or the second decision unit 31 estimates the original transmission data, the corresponding first R/S decoder 30 or the second R/S decoder 32 alternately checks errors. When both of these R/S decoders have decided that "there is no error", the repetitive processing by the turbo encoder is finished. Then, the error correction is carried out for the estimated original transmission data by using the Reed-Solomon code, and the transmission data of higher estimate precision is output.

A third method is as follows. This method improves a problem that the first and second methods make an erroneous decision that "there is no error" and carry out an error correction when the repetitive processing is not executed. For example, in the third method, the repetitive processing is executed by a predetermined number of times. After a bit error ratio has been lowered to a certain degree, the error correction is carried out for the estimated original transmission data by using the Reed-Solomon code, and the transmission data of higher estimate precision is output.

As explained above, when the decoder shown in FIG. 4(b) is used, it is possible to decrease the soft decision processing of a large calculation quantity, and realize satisfactory transmission characteristics, even when the constellation increases along the increase in the multi-value modulation system. This becomes possible based on the provision of the turbo decoder that carries out a soft decision processing to the lower two bits of the received signal that have a possibility of characteristic degradation and an error correction according to the Reed-Solomon code, and the decision units that carry out a hard decision of other bits of the received signal.

Further, it becomes possible to decrease the iteration number, by estimating the transmission data with the first R/S decoder 30 and the second R/S decoder 32. As a result, it becomes possible to further decrease the soft decision processing of a large calculation quantity and the processing time. Further, it has been known well that, in the transmission route that has a coexistence of random errors and burst errors, it is possible to obtain excellent transmission characteristics by using both the R-S (Reed-Solomon) code that corrects errors in a symbol unit, and other known error correction code.

The above explains the basic operation of the communication apparatus that employs the multi-carrier modulation/demodulation system, and the operation of the communication apparatus that uses a turbo code in order to obtain satisfactory transmission characteristics and high-transmission rate. Next, from the viewpoint of "further improvement in the transmission rate", there will be explained a communication apparatus that makes a maximum utilization of the "good transmission efficiency" and the "flexibility of functions" that are the characteristics of the multi-carrier modulation/demodulation system, with reference to FIG. 1. For the sake of convenience of explanation, 128 sub-carriers are assumed. For example, the 256 complex FFT will be used for demodulating the 128 sub-carriers. The 128complex FFT will be used to demodulate only 64 even sub-carriers out of the 128 sub-carries.

Assume data communications according to 128 sub-carriers, based on the utilization of the DMT modulation/demodulation system. In this case, the former half section and the latter half section of even sub-carriers have the same waveforms. The combined waveforms are also the same for the former half section and the latter half section (refer to FIG. 6(*a*)). On the other hand, the waveforms are inverted between the former half section and the latter half section of odd sub-carriers. The combined waveforms are also inverted between the former half section and the latter half section (refer to FIG. 6(*b*)). FIG. 6 shows diagrams that are waveforms of sub-carriers and combined waveforms respectively.

In the transmission system of the present embodiment, when the BPSK is employed as a primary modulation system, an inverse Fourier transform (256 complex FFT) is executed to the signal after the BPSK modulation, and a transmission symbol is generated. By utilizing the above characteristics, the transmission symbol is prepared as a half symbol without changing the number of bits allocated to the sub-carriers. The transmission rate is improved in this way. However, when the transmission symbol is prepared as a half symbol, it is not possible to maintain orthogonality of the OFDM symbol, and this brings about mutual interference between sub-carriers.

On the other hand, the reception system separates the received signal into even sub-carriers and odd sub-carriers, thereby to make it possible to demodulate the sub-carriers when interference has occurred. Specifically, the reception system first demodulates only even sub-carriers, and thereafter demodulates odd sub-carriers.

The operation of the reception system will be explained next. First, the 128 complex FFT 2 receives a digital waveform (half-symbolized received symbol) after a filtering processing and an A/D conversion, and converts a serial data into a parallel data. The 128 complex FFT 2 executes a Fourier transform to the parallel data. In other words, the 128 complex FFT 2 extracts only 64 even sub-carriers from among 128 sub-carriers. Usually, a full 256 complex FFT is used to perform Fourier transform on a received signal (128 sub-carriers). However, in order to perform Fourier transform on only the even sub-carrier component of the half-symbolized received symbol in this case, the 128 complex FFT that is a half of the 256 complex FFT is used. The odd sub-carriers cannot maintain orthogonality, and thereby become noise.

Next, the decoder 3 receives extracted 64 even sub-carriers, and carries out the decoding according to the predetermined method (refer to FIG. 4(*b*)). After making a decision, the decoder 3 reproduces the original transmission data. The data allocated to the even sub-carriers is output as it is.

Further, in the reception system, the 128 complex IFFT 4 carries out an inverse fast Fourier transform to the data that has been allocated to the even sub-carriers, and thereby generates a symbol that has been structured with only the waveform of the even sub-carriers (refer to FIG. 6(*a*)).

Next, the subtractor 5 removes the symbol component that has been structured with only the waveform of the even sub-carriers, from the half-symbolized received symbol, and extracts a symbol (half symbol) that has been structured with only the waveform of odd sub-carriers (refer to FIG. 6(*b*)). The symbol generating section 6 adds a symbol that has been generated by copying and inverting the symbol, to the back of the symbol after the subtraction by utilizing the characteristics of the odd sub-carriers shown in FIG. 6(*b*). The symbol generating section 6 generates a symbol in the status before the transmission system executes the half-symbolization.

Last, in the reception system, the 256 complex FFT 7 executes a Fourier transform to the received symbol (full symbol) that has been structured with only the odd sub-carriers. The decoder 8 receives extracted 64 odd sub-carriers, and carries out the decoding according to the predetermined method (refer to FIG. 4(*b*)). After making a decision, the decoder 8 reproduces the original transmission data.

It is noted that, in the present embodiment, when an error has occurred in the decoded data, it is possible to improve the demodulation characteristics by repeatedly executing the following processing. The 256 complex IFFT 9 carries out an inverse fast Fourier transform to the data that has been allocated to the odd sub-carriers. The symbol generating section 10 prepares a half-rated time waveform of the odd sub-carriers after the inverse fast Fourier transform by utilizing the characteristics of the even sub-carriers shown in FIG. 6(*a*). As a result, it is possible to generate a symbol (half symbol) that has been structured with only the odd sub-carriers (refer to FIG. 6(*a*)). Next, the subtractor 1 removes the symbol component that has been structured with only the waveform of the odd sub-carriers, from the received symbol. Thereafter, the reception system carries out a demodulation processing by using the received symbol after the removal of the symbol component.

A reason why it is possible to individually demodulate the even sub-carriers and the odd sub-carriers by separating these sub-carriers will be explained next.

In general, in the OFDM modulator, a combined waveform of a plurality of sub-carriers becomes an OFDM modulation wave as shown in the equation (1).

$$s(t) = \text{Re}\left[\sum_{n=0}^{N-1} d_n e^{j2\pi n f_0 t}\right] \quad (1)$$

where Re [ ] represents a real part, $d_n = R_n + jI_n$, and $0 \leq t \leq T_s$ ($T_s$ represents an OFDM symbol period), $f_0$ represents a carrier interval between adjacent sub-carriers, and $nf_0$ represents an n-th sub-carrier.

When a complex equalization low-pass signal of the OFDM is expressed as u (t), this u (t) can be expressed as given in the equation (2).

$$u(t) = \sum_{n=0}^{N-1} d_n e^{j2\pi n f_0 t} \quad (2)$$

When u (t) is sampled for each $1/(Nf_0)$, it is possible to express the sampled signal u $(k/Nf_0)$ as given in the equation (3).

$$u\frac{k}{Nf_0} = \sum_{n=0}^{N-1} d_n e^{\frac{j2\pi n f_0 k}{Nf_0}} \quad (3)$$
$$= \sum_{n=0}^{N-1} d_n e^{\frac{j2\pi}{N} nk}$$

From the equation (3), it is possible to express the OFDM modulation wave u $(k/Nf_0)$ of even sub-carriers as given in the equation (4), where n=2i (i=0, 1, 2, ..., (N/2)−1).

$$u\left(\frac{k}{Nf_0}\right) = \sum_{n=2i=0}^{N-2} d_n \left(e^{\frac{j2\pi}{N}}\right)^{nk} \quad (4)$$
$$= \sum_{n=2i=0}^{N-2} d_{2i} \left(e^{\frac{j2\pi}{N}}\right)^{2ik}$$

When the equation (4) is substituted by the equation (5) by setting k=(N/2) a+b (a=0, 1, b=0, 1, ..., N/2), it is possible to express the OFDM modulation wave of even sub-carriers as given in the equation (6).

$$W_N^i = e^{\frac{j2\pi i}{N}} \quad (5)$$
$$W_N^{i+N} = W_N^i, \quad W_N^{i+N/2} = -W_N^i$$

$$u\left(\frac{\frac{N}{2}a+b}{Nf_0}\right) = \begin{cases} a=0, \sum_{n=2i=0}^{N-2} d_{2i} W_N^{2bi} & \text{(former half section)} \\ a=1, \sum_{n=2i=0}^{N-2} d_{2i} W_N^{2bi} & \text{(latter half section)} \end{cases} \quad (6)$$

From the equation (6), it is known that the former half section and the latter half section of the even sub-carriers have the same waveforms.

On the other hand, it is possible to express the OFDM modulation wave u $(k/Nf_0)$ of odd sub-carriers as given in the equation (7), where n=2l+1 (l=0, 1, 2, ..., (N/2)−1).

$$u\left(\frac{k}{Nf_0}\right) = \sum_{n=0}^{N-1} d_n \left(e^{\frac{j2\pi}{N}}\right)^{nk} \quad (7)$$
$$= \sum_{n=2l+1=1}^{N-1} d_{(2l+1)} \left(e^{\frac{j2\pi}{N}}\right)^{(2l+1)k}$$

Further, when the equation (7) is substituted by the equation (8) by setting k=(N/2) a+b (a=0, 1, b=0, 1, ..., (N/2)−1), it is possible to express the OFDM modulation wave of odd sub-carriers as given in the equation (9).

$$W_N^1 = e^{\frac{j2\pi}{N}} \quad (8)$$
$$W_N^{1+N} = W_N^1, \quad W_N^{1+N/2} = -W_N^1$$

$$u\left(\frac{\frac{N}{2}a+b}{Nf_0}\right) = \begin{cases} a=0, \sum_{n=2l+1=1}^{N-1} d_{(2l+1)} W_N^{(2l+1)b} & \text{(former half section)} \\ a=1, -\sum_{n=2l+1=1}^{N-1} d_{(2l+1)} W_N^{(2l+1)b} & \text{(latter half section)} \end{cases} \quad (9)$$

From the equation (9), it is known that the former half section and the latter half section of the even sub-carriers have the inverted waveforms.

Therefore, by extracting only the former half sections from the equation (6) and the equation (9), it is possible to express as shown in the equation (10).

$$u\left(\frac{\frac{N}{2}a+b}{Nf_0}\right) = \sum_{n=1}^{N-1} d_n W_N^{nb} \quad (10)$$

$$u\left(\frac{b}{Nf_0}\right) = \sum_{n=1}^{N-1} d_n W_N^{nb} \quad \text{(former half section: } a = 0\text{)}$$

Next, a signal component of even sub-carriers is extracted from the equation (10). When an odd sub-carrier component of $d_n$ is 0, a signal component of even sub-carriers becomes the same as that of the former half section of the equation (6), and becomes as shown in the equation (11).

$$u\left(\frac{b}{Nf_0}\right) = \sum_{i=0}^{N/2-1} d_{2i} W_N^{2ib} \quad \text{(former half section)} \quad (11)$$

When the signal component of the even sub-carriers is demodulated with the FFT of the N/2 input, it is possible to express the modulated signal y (2k) as shown in the equation (12), (k=0, 1, ..., (N/2)−1).

$$y(2k) = \frac{1}{N/2} \sum_{b=0}^{N/2-1} u\left[\frac{b}{Nf_0}\right] W_{N/2}^{-bk} \quad (12)$$
$$= \frac{1}{N/2} \sum_{b=0}^{N/2-1} \sum_{i=0}^{N/2-1} d_{2i} W_N^{2ib} W_{N/2}^{-bk}$$
$$= \frac{1}{N/2} \sum_{b=0}^{N/2-1} \sum_{i=0}^{N/2-1} d_{2i} W_{N/2}^{ib} W_{N/2}^{-bk}$$
$$= \frac{1}{N/2} \sum_{i=0}^{N/2-1} d_{2i} \sum_{b=0}^{N/2-1} W_{N/2}^{(i-k)b}$$

A relationship of the equation (13) is established.

$$\sum_{b=0}^{N/2-1} W_{N/2}^{(i-k)b} = \begin{cases} N/2 (i-k = 0, \pm N/2, \pm 2N/2, \ldots) \\ 0 \text{ (others)} \end{cases} \quad (13)$$

Therefore, when the relationship of the equation (13) is applied to the equation (12), it is possible to express the modulated signal as shown in the equation (14).

$$y(2k) = \begin{cases} d_{2k} (0 \le k < N/2 - 1) \\ \text{omitted (other } k) \end{cases} \quad (14)$$

Next, a signal component of odd sub-carriers is extracted from the equation (10). When an even sub-carrier component of $d_n$ is 0, a signal component of odd sub-carriers becomes the same as that of the former half section of the equation (9), and becomes as shown in the equation (15).

$$u\left(\frac{b}{Nf_0}\right) = \sum_{l=0}^{N/2-1} d_{2l+1} W_N^{(2l+1)b} \quad \text{(former half section: } a = 0\text{)} \quad (15)$$

When the signal component of the odd sub-carriers is demodulated with the FFT of the N/2 input, it is possible to express the modulated signal y' (2k) as shown in the equation (16) (k=0, 1, . . . , (N/2)−1). However, y' (2k) expresses an interference component of the odd sub-carriers.

$$\begin{aligned}
y'(2k) &= \frac{1}{N/2} \sum_{b=0}^{N/2-1} u\left(\frac{b}{Nf_0}\right) W_{N/2}^{-bk} \\
&= \frac{1}{N/2} \sum_{b=0}^{N/2-1} \sum_{l=0}^{N/2-1} d_{2l+1} W_N^{(2l+1)b} W_{N/2}^{-bk} \\
&= \frac{1}{N/2} \sum_{b=0}^{N/2-1} \sum_{l=0}^{N/2-1} d_{2l+1} W_{N/2}^{(l+1/2)b} W_{N/2}^{-bk} \\
&= \frac{1}{N/2} \sum_{b=0}^{N/2-1} \sum_{l=0}^{N/2-1} d_{2l+1} W_{N/2}^{(l+1/2-k)b} \\
&= \frac{1}{N/2} \sum_{b=0}^{N/2-1} \sum_{l=0}^{N/2-1} d_{2l+1} \cos\left(\frac{2\pi(l+1/2-k)b}{N/2}\right) + \\
&\quad j\frac{1}{N/2} \sum_{b=0}^{N/2-1} \sum_{l=0}^{N/2-1} d_{2l+1} \sin\left(\frac{2\pi(l+1/2-k)b}{N/2}\right) \\
&= \frac{1}{N/2} \sum_{l=0}^{N/2-1} d_{2l+1} + \\
&\quad j\frac{1}{N/2} \sum_{b=0}^{N/2-1} \sum_{l=0}^{N/2-1} d_{2l+1} \sin\left(\frac{2\pi(l+1/2-k)b}{N/2}\right)
\end{aligned} \quad (16)$$

Therefore, data z (2k) that is allocated to the even sub-carriers obtained after demodulating the half symbol can be expressed as shown in the equation (17).

$$\begin{aligned}
z(2k) &= y(2k) + y'(2k) \\
&= d_{2k} + \frac{1}{N/2} \sum_{l=0}^{N/2-1} d_{2l+1} + \\
&\quad j\frac{1}{N/2} \sum_{b=0}^{N/2-1} \sum_{l=0}^{N/2-1} d_{2l+1} \sin\left(\frac{2\pi(l+1/2-k)b}{N/2}\right)
\end{aligned} \quad (17)$$

When the BPSK of disposition of signal points expressed in the code (0, 1) and the signal (1, −1) is used, it is possible to express a decision value Z (2k) of the data z (2k) allocated to the even sub-carriers as shown in the equation (18) by judging only the real part. However, $d_{2k}=R_{2k}+jI_{2k}$. Particularly, $d_{2k}=R_{2k}$ for the BPSK.

$$\begin{aligned}
Z(2k) &= \text{Re}[y(2k) + y'(2k)] \\
&= R_{2k} + \frac{1}{N/2} \sum_{l=0}^{N/2-1} R_{2l+1} + \\
&\quad j\frac{1}{N/2} \sum_{b=0}^{N/2-1} \sum_{l=0}^{N/2-1} R_{2l+1} \sin\left[\frac{2\pi(l+1/2-k)b}{N/2}\right] \\
&= R_{2k} + \frac{1}{N/2} \sum_{l=0}^{N/2-1} R_{2l+1}
\end{aligned} \quad (18)$$

Therefore, in the case of the BPSK, the interference component to the data of even sub-carriers becomes a value obtained by adding modulated signals of the (1/N) timed data of odd sub-carriers for the total sub-carrier component. When the modulated data has been scrambled, it is known that the signal allocated to the odd sub-carriers has substantially equal probabilities of the occurrence of 1 and the occurrence of −1. Further, the total sum of the total odd sub-carriers becomes close to 0. Therefore, when the number of sub-carriers is sufficiently large, it is possible to approximate the equation (18) to the equation (19).

$$\begin{aligned}
Z(2k) &= R_{2k} + \frac{1}{N/2} \sum_{l=0}^{N/2-1} R_{2l+1} \\
&\cong R_{2k}
\end{aligned} \quad (19)$$

From the above, it can be known that it is possible to individually demodulate the even sub-carriers and the odd sub-carriers by separating these sub-carriers when an a transmission symbol is generated by executing an inverse Fourier transform to a signal after the BPSK modulation, and when the transmission symbol is half-symbolized.

As explained above, according to the present embodiment, when the BPSK is employed as a primary modulation system, the communication apparatus at the transmission side transmits a signal by half-symbolizing the transmission symbol. The communication apparatus at the reception side separates the received signal into even sub-carriers and odd sub-carriers, and demodulates only the received symbol of the half-symbolized even sub-carriers. Thereafter, the communication apparatus at the reception side removes the symbol component of the even sub-carriers from the received symbol, and then demodulates only the received symbol of the odd sub-carriers. Based on this, it becomes possible to compress the symbol on the time axis, and expand the transmission capacity to about two times. Further, according to the present embodiment, the symbol that is structured with only the waveform of the odd sub-carriers is fed back, and the odd sub-carriers that become the noise component can be removed from the received symbol. Therefore, it is possible to substantially improve the demodulation precision.

Although the 128 sub-carriers are assumed for the sake of convenience of explanation in the present embodiment, the number of sub-carriers is not limited to this. When the number of sub-carriers is other than 128, the numbers of the FFT and the IFFT also change corresponding to the number of the sub-carriers.

Second Embodiment

Figure 7:
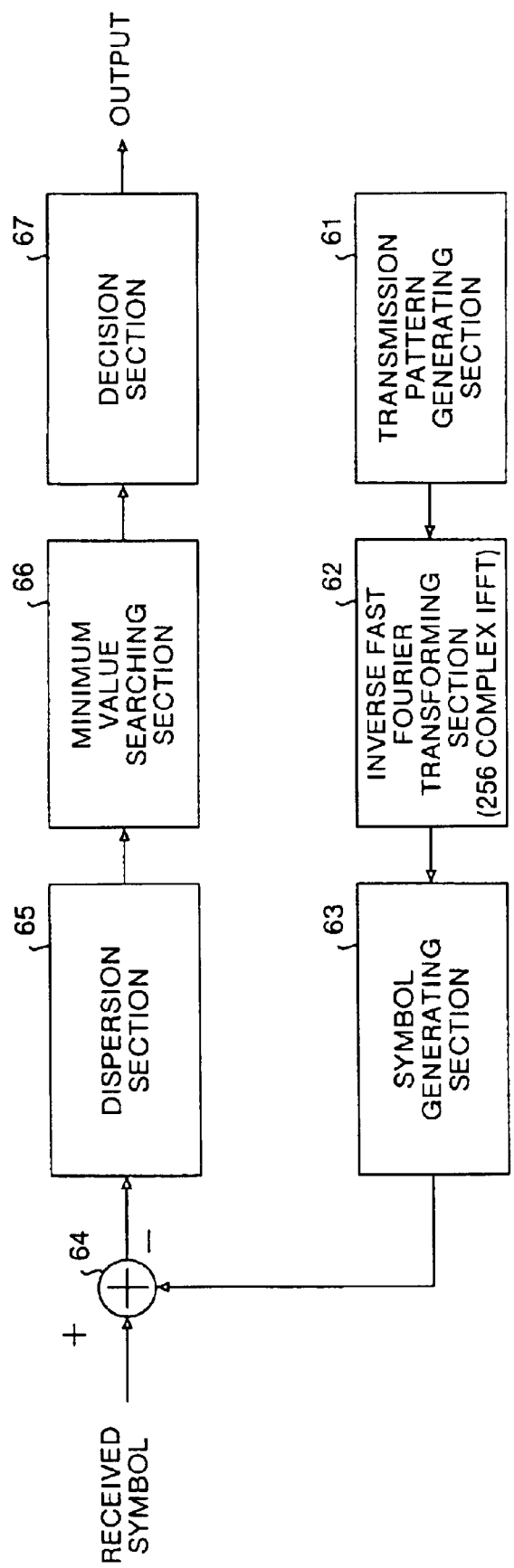
FIG. 7 is a diagram that shows a structure of a second embodiment of the communication apparatus according to the present invention.

FIG. 7 is a diagram that shows a structure of a second embodiment of the communication apparatus according to the present invention. Specifically, this is a diagram that shows a structure of the reception system of the communication apparatus according to the present invention. In FIG. 7, a reference numeral 61 denotes a transmission pattern generating section, 62 denotes an inverse fast Fourier transforming section (256 complex IFFT), and 63 denotes a symbol generating section. A reference numeral 64 denotes a subtractor, 65 denotes a dispersion section, 66 denotes a minimum value searching section, and 67 denotes a decision section. The structure and the operation of the transmission system are similar to those of the first embodiment, and therefore, explanation on them will be omitted. Only sections that are different from those of the first embodiment will be explained.

The operation of the reception system of the communication apparatus according to the present invention will be explained below. First, the transmission pattern generating section 61 generates a combination of data that could occur, and occasionally outputs the data to the inverse fast Fourier transforming section 62. The inverse fast Fourier transforming section 62 carries out an inverse fast Fourier transform to the received combination of data, and generates a symbol that is structured with time axis data of even sub-carriers and odd sub-carriers. The symbol generating section 63 deletes the latter half section of the symbol, and generates a half-symbolized symbol.

The subtractor 64 subtracts a symbol that is occasionally received from the symbol generating section 63, from the received symbol. The dispersion section 65 sequentially obtains a squared average (a dispersion value) of amplitude for all the received subtraction results. The minimum value searching section 66 detects a minimum value from among the received squared average value. The decision section 67 decides a data combination corresponding to the minimum value of the squared average value as most likely, from among all data combinations that could occur, and fixes this data combination as a final decision value.

As explained above, according to the present embodiment, the communication apparatus at the transmission side executes an inverse Fourier transform (256 complex FFT) to the signal after the BPSK modulation, thereby to generate a transmission symbol and half-symbolize this transmission symbol. The communication apparatus at the reception side occasionally cancels the time axis data (half-symbolized symbol) of all sub-carriers that have been generated based on the data combinations that could occur, from the received symbols. Further, the communication apparatus at the reception side calculates a dispersion value by using the signal after the cancellation, and decides a data combination corresponding to the minimum value of the calculation result as a decision value. As a result, it becomes possible to compress the data on the time axis, and enlarge the transmission capacity to about two times.

Third Embodiment

Figure 8:
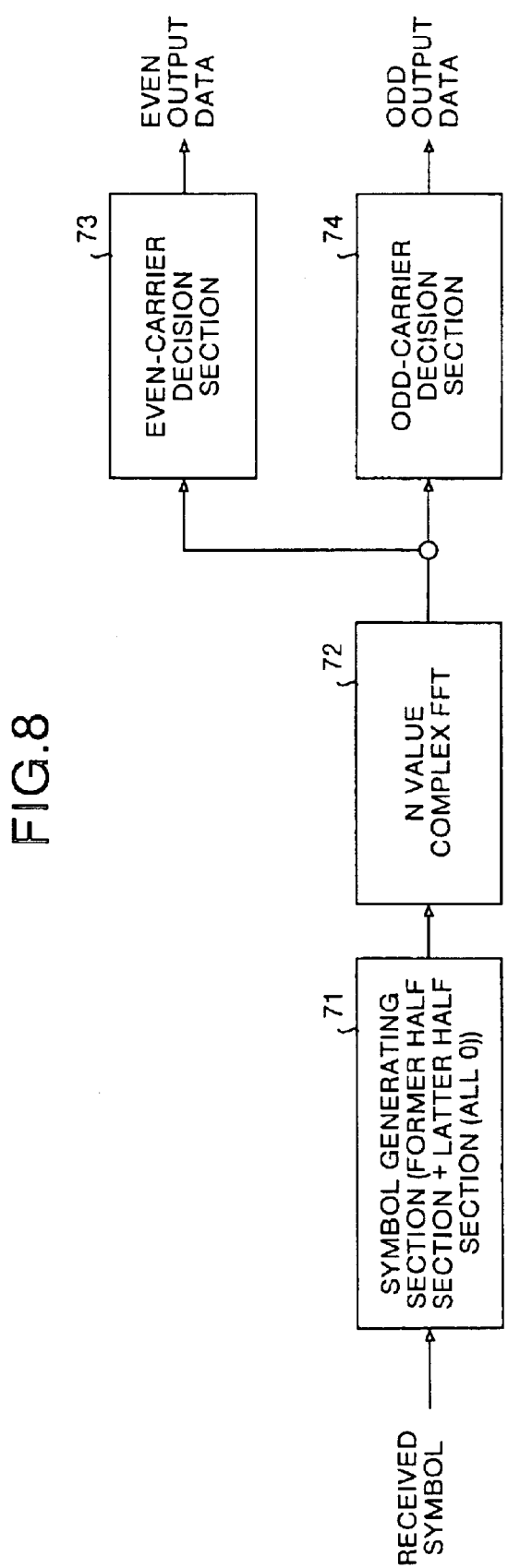
FIG. 8 is a diagram that shows a structure of a third embodiment of the communication apparatus according to the present invention.

FIG. 8 is a diagram that shows a structure of a third embodiment of the communication apparatus according to the present invention. Specifically, this is a diagram that shows a structure of the reception system of the communication apparatus according to the present invention. In FIG. 8, a reference numeral 71 denotes a symbol generating section, 72 denotes a fast Fourier transforming section (N value complex FFT), 73 denotes an even-carrier generating section, and 74 denotes an odd-carrier generating section. The structure and the operation of the transmission system are similar to those of the first embodiment, and therefore, explanation on them will be omitted. Only sections that are different from those of the first or second embodiment will be explained.

The operation of the reception system of the communication apparatus according to the present invention will be explained below. First, the symbol generating section 71 adds a symbol of all 0 to the back of a half-symbolized received symbol. The transmission system generates a symbol of a size before the transmission system executes the half symbolization. The N value complex FFT 72 carries out a Fourier transform to a symbol that has been generated by the symbol generating section 71, and extracts/outputs even sub-carriers and odd sub-carriers.

For example, when N is 4, it is possible to express the even sub-carriers and odd sub-carriers (y (0), y (1) y (3), y (4)) as shown in the equation (20).

$$\begin{bmatrix} y(0) \\ y(1) \\ y(2) \\ y(3) \end{bmatrix} = \frac{1}{N} \begin{bmatrix} W_4^0 & W_4^0 & W_4^0 & W_4^0 \\ W_4^0 & W_4^{-1} & W_4^{-2} & W_4^{-3} \\ W_4^0 & W_4^{-2} & W_4^{-4} & W_4^{-6} \\ W_4^0 & W_4^{-3} & W_4^{-6} & W_4^{-9} \end{bmatrix} \begin{bmatrix} W_4^0 & W_4^0 & W_4^0 & W_4^0 \\ W_4^0 & W_4^1 & W_4^2 & W_4^3 \\ 0 & 0 & 0 & 0 \\ 0 & 0 & 0 & 0 \end{bmatrix} \begin{bmatrix} d(0) \\ d(1) \\ d(2) \\ d(3) \end{bmatrix} \quad (20)$$

The above explains the case of N=4, that is, a four-value FFT. As a general expression method, it is possible to express the N value complex FFT 72 as shown in the equation (21).

$$\frac{1}{N} \begin{bmatrix} W_N^0 & W_N^0 & W_N^0 & \ldots & W_N^0 \\ W_N^0 & W_N^{-1} & W_N^{-2} & \ldots & W_N^{-(N-1)} \\ W_N^0 & W_N^{-2} & W_N^{-4} & \ldots & W_N^{-2(N-1)} \\ W_N^0 & W_N^{-3} & W_N^{-6} & \ldots & W_N^{-3(N-1)} \\ \vdots & \vdots & \vdots & & \vdots \\ W_N^0 & W_N^{-(N-1)} & W_N^{-2(N-1)} & \ldots & W_N^{-(N-1)^2} \end{bmatrix} \quad (21)$$

Next, the even-carrier decision section 73 judges a data allocated to the received even sub-carriers, and reproduces the original transmission data. The odd-carrier decision section 74 judges a data allocated to the received odd sub-carriers, and reproduces the original transmission data.

As explained above, according to the present embodiment, the communication apparatus at the transmission side executes an inverse Fourier transform (256 complex FFT) to the signal after the BPSK modulation, thereby to generate a transmission symbol and half-symbolize this transmission symbol. The communication apparatus at the reception side adds a symbol of all 0 to the back of the half-symbolized received symbol. The communication apparatus at the reception side further carries out a Fourier transform to a symbol after the addition of the symbol of all 0 thereto, and extracts even sub-carriers and odd sub-carriers. As a result, it becomes possible to compress the symbol on the time axis and enlarge the transmission capacity to about two times. It is noted that, in the present embodiment, an error correction section like the R-S (Reed-Solomon) may be provided at a latter stage of each decision section in order to improve the demodulation precision.

Fourth Embodiment

Figure 9:
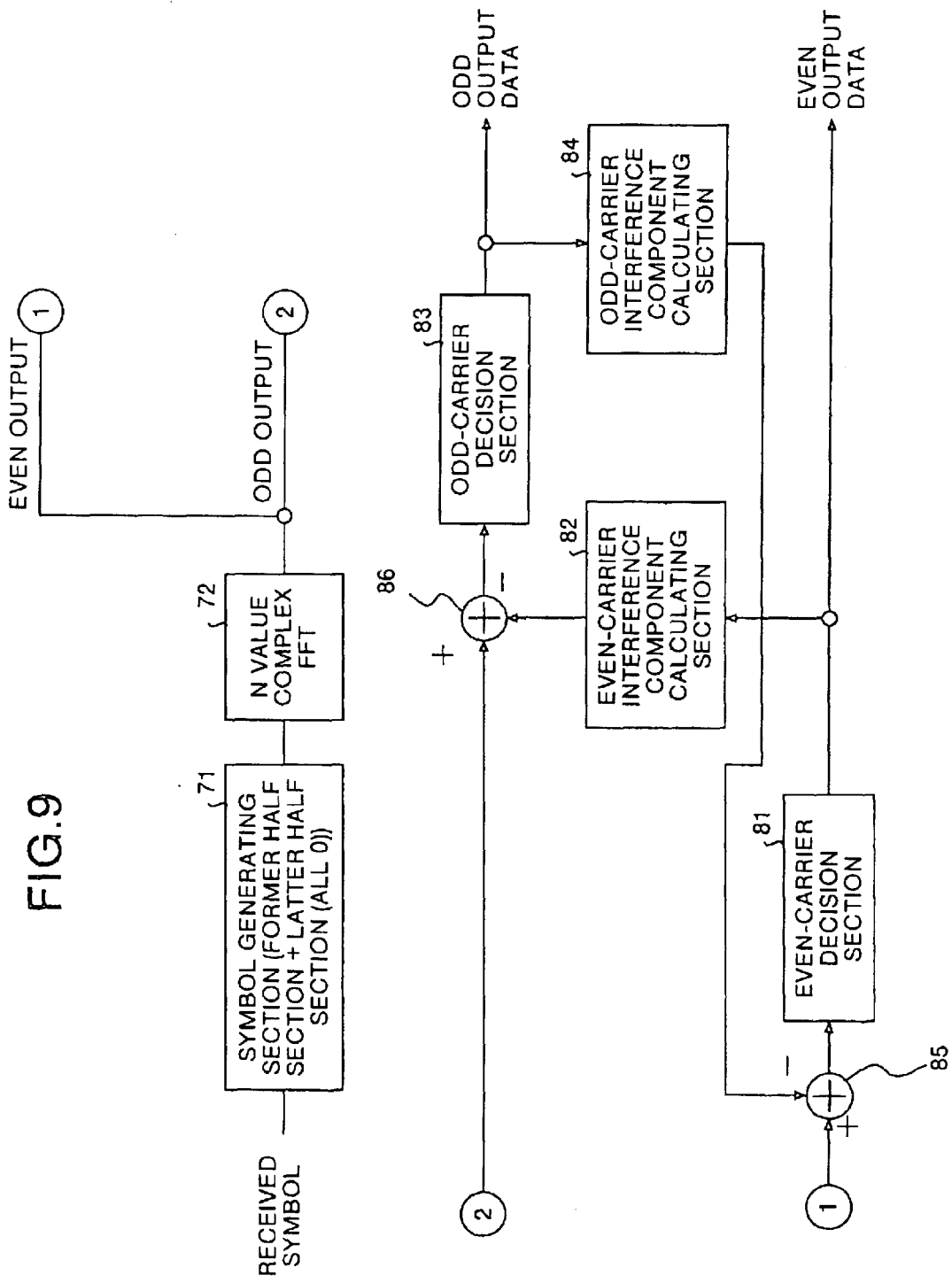
FIG. 9 is a diagram that shows a structure of a fourth embodiment of the communication apparatus according to the present invention.

FIG. 9 is a diagram that shows a structure of a fourth embodiment of the communication apparatus according to the present invention. Specifically, this is a diagram that shows a structure of the reception system of the communication apparatus according to the present invention. In FIG. 9, a reference numeral 81 denotes an even-carrier decision section, 82 denotes an even-carrier interference component calculation section, 83 denotes an odd-carrier decision section, 84 denotes an odd-carrier interference component calculation section, and 85 and 86 denote subtractors. Structures that are similar to those of the above embodiments are attached with the same reference numerals, and explanation on them will be omitted. Only sections that are different from those of the third embodiment will be explained.

The operation of the transmission system and the reception system of the communication apparatus according to the present invention will be explained below. The transmission system of the present embodiment executes an inverse Fourier transform (256complex FFT) to a signal after a QPSK modulation, thereby to generate a transmission symbol. The transmission system half-symbolizes the transmission symbol without changing the number of bits allocated to sub-carriers by utilizing the characteristics shown in FIG. 6 to improve the transmission rate. However, when the transmission symbol is half-symbolized, it becomes impossible to maintain the orthogonality of the OFDM symbol, and a mutual interference occurs between the sub-carriers.

On the other hand, in the reception system of the present embodiment, the even-carrier decision section 81 makes a hard decision on the data of even carriers that are output of an N value complex FFT 72. Further, the even-carrier interference component calculation section 82 calculates the interference component of the even carriers, that is, the noise component of the odd carriers.

The subtractor 86 removes the interference component of the even carriers from the odd sub-carrier output of the N value complex FFT 72. The odd-carrier decision section 83 makes a hard decision on the data of odd sub-carriers after the removal of the interference component. Further, the odd-carrier interference component calculation section 84 calculates the interference component of the odd carriers, that is, the noise component of the even carriers.

The subtractor 86 removes the interference component of the odd carriers from the even sub-carrier output of the N value complex FFT 72. Thereafter, the reception system of the present embodiment outputs a decision result of the even-carrier decision section 81 and a decision result of the odd-carrier decision section 83 after repeating the above processing by a predetermined number, as final decision values.

As explained above, according to the present embodiment, the communication apparatus at the transmission side executes an inverse Fourier transform (256 complex FFT) to the signal after the QPSK modulation, thereby to generate a transmission symbol and half-symbolize this transmission symbol. The communication apparatus at the reception side adds a symbol of all 0 to the back of the half-symbolized received symbol. The communication apparatus at the reception side further carries out a Fourier transform to a symbol after the addition of the symbol of all 0 thereto, and extracts even sub-carriers and odd sub-carriers. The communication apparatus at the reception side outputs the decision results after the removal of mutual interference as final decision values. As a result, it becomes possible to compress the symbol on the time axis and enlarge the transmission capacity to about two times, when the QPSK is employed as a primary modulation system. It is noted that, in the present embodiment, it is possible to provide an error correction section like the R-S (Reed-Solomon) at a latter stage of each decision section, in order to improve the demodulation precision.

As explained above, according to the present invention, an inverse Fourier transform (256 complex FFT) is executed to the signal after the BPSK modulation to generate a transmission symbol, and this transmission symbol is half-symbolized. The communication apparatus at the reception side separates the received signal into even sub-carriers and odd sub-carriers, and demodulates only the received symbol of the half-symbolized even sub-carriers. Thereafter, the communication apparatus at the reception side removes the symbol component of the even sub-carriers from the received symbol, and then demodulates only the received symbol of the odd sub-carriers. Based on this, it becomes possible to compress the symbol on the time axis, and there is an effect that it is possible to obtain the communication apparatus that can expand the transmission capacity to about two times.

According to the next invention, the symbol that is structured with only the waveform of the odd sub-carriers is fed back, and the odd sub-carriers that become the noise component can be removed from the received symbol. Therefore, there is an effect that it is possible to obtain the communication apparatus that can substantially improve the demodulation precision.

According to the next invention, the communication apparatus at the transmission side executes an inverse Fourier transform (256 complex FFT) to the signal after the BPSK modulation, thereby to generate a transmission symbol and half-symbolize this transmission symbol. The communication apparatus at the reception side occasionally cancels the time axis data (half-symbolized symbol) of all sub-carriers that have been generated based on the data combinations that could occur, from the received symbols. Further, the communication apparatus at the reception side calculates a dispersion value by using the signal after the cancellation, and decides a data combination corresponding to a minimum value of the calculation result as a decision value. As a result, it becomes possible to compress the data on the time axis, and there is an effect that it possible to obtain the communication apparatus that can enlarge the transmission capacity to about two times.

According to the next invention, the communication apparatus at the transmission side executes an inverse Fourier transform (256 complex FFT) to the signal after the BPSK modulation, thereby to generate a transmission symbol and half-symbolize this transmission symbol. The communication apparatus at the reception side adds a symbol of all 0 to the back of the half-symbolized received symbol. The communication apparatus at the reception side further carries out a Fourier transform to a symbol after the addition of the symbol of all 0 thereto, and extracts even sub-carriers and odd sub-carriers. As a result, it becomes possible to compress the symbol on the time axis, and there is an effect that it is possible to obtain the communication apparatus that can enlarge the transmission capacity to about two times.

According to the next invention, the communication apparatus at the transmission side executes an inverse Fourier transform (256 complex FFT) to the signal after the QPSK modulation, thereby to generate a transmission symbol and half-symbolize this transmission symbol. The communication apparatus at the reception side adds a symbol of all 0 to the back of the half-symbolized received symbol. The communication apparatus at the reception side further carries out a Fourier transform to a symbol after the addition of the symbol of all 0 thereto, and extracts even sub-carriers and odd sub-carriers. The communication apparatus at the reception side outputs the decision results after the removal of mutual interference as final decision values. As a result, it becomes possible to compress the symbol on the time axis, and there is an effect that it is possible to obtain the communication apparatus that can enlarge the transmission capacity to about two times, when the QPSK is employed as a primary modulation system.

According to the next invention, an inverse Fourier transform (256 complex FFT) is executed to the signal after the BPSK modulation to generate a transmission symbol, and this transmission symbol is half-symbolized. The reception unit at the reception side separates the received signal into even sub-carriers and odd sub-carriers, and demodulates only the received symbol of the half-symbolized even sub-carriers. Thereafter, the reception unit removes the symbol component of the even sub-carriers from the received symbol, and then demodulates only the received symbol of the odd sub-carriers. Based on this, it becomes possible to compress the symbol on the time axis, and there is an effect that it is possible to expand the transmission capacity to about two times.

According to the next invention, the symbol that is structured with only the waveform of the odd sub-carriers is fed back, and the odd sub-carriers that become the noise component can be removed from the received symbol. Therefore, there is an effect that it is possible to substantially improve the demodulation precision.

According to the next invention, the communication apparatus at the transmission side executes an inverse Fourier transform (256 complex FFT) to the signal after the BPSK modulation, thereby to generate a transmission symbol and half-symbolize this transmission symbol. The communication apparatus at the reception side occasionally cancels the time axis data (half-symbolized symbol) of all sub-carriers that have been generated based on the data combinations that could occur, from the received symbols. Further, the communication apparatus at the reception side calculates a dispersion value by using the signal after the cancellation, and decides a data combination corresponding to a minimum value of the calculation result as a decision value. As a result, it becomes possible to compress the symbol on the time axis, and there is an effect that it possible to enlarge the transmission capacity to about two times.

According to the next invention, the communication apparatus at the transmission side executes an inverse Fourier transform (256 complex FFT) to the signal after the BPSK modulation, thereby to generate a transmission symbol and half-symbolize this transmission symbol. The communication apparatus at the reception side adds a symbol of all 0 to the back of the half-symbolized received symbol. The communication apparatus at the reception side further carries out a Fourier transform to a symbol after the addition of the symbol of all 0 thereto, and extracts even sub-carriers and odd sub-carriers. As a result, it becomes possible to compress the symbol on the time axis, and there is an effect that it is possible to enlarge the transmission capacity to about two times.

According to the next invention, the communication apparatus at the transmission side executes an inverse Fourier transform (256 complex FFT) to the signal after the QPSK modulation, thereby to generate a transmission symbol and half-symbolize this transmission symbol. The communication apparatus at the reception side adds a symbol of all 0 to the back of the half-symbolized received symbol. The communication apparatus at the reception side further carries out a Fourier transform to a symbol after the addition of the symbol of all 0 thereto, and extracts even sub-carriers and odd sub-carriers. The communication apparatus at the reception side outputs the decision results after the removal of mutual interference as final decision values. As a result, it becomes possible to compress the symbol on the time axis, and there is an effect that it is possible to enlarge the transmission capacity to about two times when the QPSK is employed as a primary modulation system.

Industrial Applicability

As explained above, the communication apparatus and the communication method according to the present invention are suitable for data communications using existing communication lines based on the DMT (Discrete Multi Tone) modulation/demodulation system or the OFDM (Orthogonal Frequency Division Mutiplex) modulation/demodulation system.

What is claimed is:

1. A communication apparatus that employs a multi-carrier modulation/demodulation system, comprising:

a transmission unit which generates a symbol to be transmitted by carrying out an inverse Fourier transform to a signal after a BPSK modulation, and transmits the transmission symbol in a half-symbolized status, and a reception unit which receives the half symbolized symbol, the reception unit includes;

a first fast Fourier transform section that carries out a predetermined Fourier transform to the half-symbolized received symbol in order to extract even sub-carriers; and a first decoder that demodulates data allocated to the even sub-carriers extracted by the first fast Fourier transform section;

an inverse fast Fourier transform section that carries out an inverse Fourier transform on the data allocated to the even sub-carriers outputted by the first decoder, and generates a first symbol that is structured with a time waveform of the even sub-carriers;

a subtractor that removes a component of the first symbol generated by the inverse fast Fourier transform section, component from the half-symbolized received symbol, and extracts from the half-symbolized symbol a second symbol that is structured with a time waveform of odd sub-carriers;

a symbol generating section that generates a third symbol by adding a generated symbol, obtained by copying and inverting the second symbol extracted by the subtractor, the end of the second symbol;

a second fast Fourier transform section that carries out a predetermined Fourier transform on the third symbol generated by the symbol generating section in order to extract the odd sub-carriers; and a second decoder that demodulates data allocated to the odd sub-carriers extracted by the second fast Fourier transform section.

2. The communication apparatus according to claim 1, wherein said reception unit further includes:

a second inverse fast Fourier transform section that carries out an inverse Fourier transform to the data allocated to the odd sub-carriers outputted by the second decoder; and a second symbol generating section that generates a fourth symbol that is structured with a time waveform of the odd sub-carriers and feeds back the fourth symbol to a second subtractor, wherein the second subtractor removes a component of the fourth symbol from the half symbolized symbol, for enabling a demodulation processing using the half symbolized symbol with the component of the fourth symbol removed.

3. A communication method of employing a multi-carrier modulation/demodulation system, comprising the steps of:

generating a symbol to be transmitted by carrying out an inverse Fourier transform to a signal after a BPSK modulation, and transmitting the symbol in a half-symbolized status;

receiving the half-symbolized symbol at a reception unit;

an demodulating even sub carries by carrying out a predetermined first Fourier transform on the half-symbolized symbol in order to extract the even sub-carriers;

demodulating data allocated to the even sub-carriers;

generating a first symbol by carrying out an inverse Fourier transform on the data allocated to the even sub-carriers, and generating the first symbol that is structured with a time waveform of the even sub-carriers;

generating a second symbol by removing the first symbol component from the half-symbolized symbol, and extracting from the half-symbolized symbol the second symbol that is structured with a time waveform of odd sub-carriers;

generating a third symbol by adding a generated symbol, obtained by copying and inverting the second symbol, to the end of the second symbol;

demodulating odd sub-carriers by carrying out a predetermined second Fourier transform on the third symbol in order to extract the odd sub-carriers; and demodulating data allocated to the odd sub-carriers.

4. The communication method according to claim 3, further comprising the steps of:

generating a fourth symbol by carrying out an inverse Fourier transform on the data allocated to the odd sub-carriers; and generating a fourth symbol that is structured with a time waveform of the odd sub-carriers; and removing a component of the fourth symbol from the half-symbolized symbol, wherein a demodulation process is carried out by using the half-symbolized symbol with the component of the fourth symbol removed.

* * * * *